United States Patent
Takushima et al.

[11] Patent Number: 5,945,464
[45] Date of Patent: Aug. 31, 1999

[54] ULTRAVIOLET-CURABLE, RESIN-FORMING THIOL-ENE COMPOSITIONS

[75] Inventors: Hidenori Takushima; Kouji Futaki, both of Tokyo, Japan

[73] Assignee: Asahi Kogaku Kogyo Kabushiki Kaisha, Tokyo, Japan

[21] Appl. No.: 08/910,120

[22] Filed: Aug. 13, 1997

[30] Foreign Application Priority Data

Aug. 14, 1996 [JP] Japan .................................... 8-214757

[51] Int. Cl.$^6$ .............................. C08F 2/48; C08L 81/02
[52] U.S. Cl. ........................ 522/180; 522/181; 522/182; 522/183; 528/370; 528/371; 528/376
[58] Field of Search .................................... 522/180, 183, 522/182, 181

[56] References Cited

U.S. PATENT DOCUMENTS

| | | |
|---|---|---|
| 4,008,341 | 2/1977 | Kehr . |
| 4,020,233 | 4/1977 | Morgan . |
| 4,120,721 | 10/1978 | Ketley et al. . |
| 4,135,047 | 1/1979 | Morgan . |
| 5,019,483 | 5/1991 | Lin et al. ................................ 430/288 |
| 5,360,873 | 11/1994 | Ohkawa et al. ........................ 522/180 |
| 5,736,609 | 4/1998 | Irizato et al. ........................... 522/135 |

FOREIGN PATENT DOCUMENTS

| | | |
|---|---|---|
| 53-28959 | 8/1978 | Japan . |
| 57-5252 | 1/1982 | Japan . |
| 60-28291 | 7/1985 | Japan . |

*Primary Examiner*—Susan W. Berman
*Attorney, Agent, or Firm*—Greenblum & Bernstein, P.L.C.

[57] ABSTRACT

The ultraviolet-curable, resin-forming composition which comprises a polycarbonic acid ester such as diethylene glycol bis(allyl carbonate), a polythiol such as pentaerythritol tetrakis(3-mercaptopropionate) and an ultraviolet curing agent. The resin-forming composition can be photopolymerized in an atmospheric condition, and the thus produced resin has an elongated durability as well as excellent properties with regard to a transparency, heat resistance, adhesion property, resistance to shock, dyeing property and others.

15 Claims, No Drawings

ULTRAVIOLET-CURABLE, RESIN-FORMING THIOL-ENE COMPOSITIONS

BACKGROUND OF THE INVENTION

1. Field of the Invention

The present invention relates to an ultraviolet (UV)-curable composition capable of being photopolymerized under atmospheric conditions, thereby forming a transparent resin having excellent properties.

2. Description of the Related Art

Previously, in the production of transparent resins by photopolymerization, vinyl monomers such as methyl acrylate, methyl methacrylate and others have been generally utilized as the monomeric components.

However, use of those vinyl monomers in the production of the transparent resin suffers from some technical problems. For example, the photopolymerization of such vinyl monomers can be disturbed by oxygen which is dissolved in a polymerization composition containing the monomers or in the atmosphere. Thus, it is very difficult to attain the polymerization and curing of the vinyl monomer-containing compositions in the atmosphere. To avoid this problem, the prior art production methods teach the introduction of an inert gas into the polymerization atmosphere, however, this and results in other problems, including increased costs.

In addition to difficulty in carrying out the polymerization thereof, the vinyl monomers suffer from yellowing or yellow discoloration of the resulting resin. For example, in the polymerization using an acrylic composition as a starting material, it is known that the resin produced upon polymerization of the composition can be yellowed over time, and a degree of the yellowing can be increased with lapse of time. The yellowing problem can be solved or diminished, if an additive such as a blueing agent is added to the acrylic composition. However, blueing agents are expensive and their yellowing-diminishing effect cannot be retained in the resulting resin for an extended period of time. With regard to obtaining an excellent durability and its long-term retention, the problem has not yet been solved in the art.

SUMMARY OF THE INVENTION

The object of the present invention is to solve the above-mentioned problems in the prior art by providing a resin-forming composition which can be photopolymerized under atmospheric conditions and by forming a resin having long-term durability as well as excellent transparency, heat resistance, adhesive properties, shock resistance, dyeing properties, flexibility, and other advantages as well.

According to the present invention, the above object can be attained by an ultraviolet-curable, resin-forming composition which comprises the following components:

(A) a polycarbonic acid ester of the general formula (I):

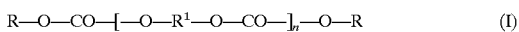

in which R represents an unsaturated group, $R^1$ represents a divalent aliphatic or aromatic group, and n is an integer of value from 1 up to 9, (B) a polythiol of the general formula (II):

in which $R^2$ represents a multivalent organic group, and m is an integer of at least 2, and (C) an ultraviolet curing agent.

As will be clarified from the description of the preferred embodiments, the object of the present invention can be accomplished, if both a certain polycarbonic acid ester and a certain polythiol are used in combination as monomeric components in a photopolymerizable, resin-forming composition, and UV rays are used as the radiation for initiating photopolymerization. According to the present invention, if the UV-curable composition is prepared as described herein, it becomes possible to conduct the photopolymerization of the composition under atmospheric conditions. The photopolymerization of the composition in atmospheric conditions means that the resin can be produced at low costs, and the resin can be easily molded into articles having any desired shape. Further, it has been found that the cured resin produced thereby has an extended durability as well as remarkably improved transparency, heat resistance, adhesive properties, shock resistance, adyeing properties, flexibility and other properties as well. Due to these properties, the UV-curable composition of the present invention can be used in the production of a wide variety of molded products for both industrial and everyday purposes. The composition can be used as a a coating material or agent, for example.

The present disclosure relates to the subject matter contained in the Japanese patent application No. 8-214757 (filed on Aug. 14, 1996) which is expressly incorporated herein by reference in its entirety.

DESCRIPTION OF PREFERRED EMBODIMENTS OF THE INVENTION

The ultraviolet-curable, resin-forming composition according to the present invention, as mentioned above, comprises two monomeric components (A) and (B) mentioned above as essential components thereof with reference to the general formulae.

The first monomeric component (A) is a polycarbonic acid ester of the above-described general formula (I) in which R represents an unsaturated group such as vinyl, 1-propenyl, allyl, isopropenyl, 1-butenyl, 2-butenyl, 2-pentynyl, ethynyl, or another unsaturated group. Further, in the above formula, $R^1$ represents a divalent aliphatic or aromatic group, and typical examples of $R^1$ group include divalent aliphatic hydrocarbon groups, derived from aliphatic diols such as trimethylene glycol, tetramethylene glycol, pentamethylene glycol, hexamethylene glycol, decamethylene glycol, diethylene glycol, p-xylylene glycol and the like, or divalent aromatic hydrocarbon groups, derived from aromatic diols such as bis(4-hydroxyphenyl)methane, 1,1-bis(4-hydroxyphenyl)ethane, 1,1-bis(4-hydroxyphenyl) butane, 1,1-bis(4-hydroxyphenyl)isobutane, 1,1-bis(4-hydroxyphenyl)cyclohexane, 2,2-bis(4-hydroxyphenyl) propane, 2,2-bis(4-hydroxyphenyl)butane and the like. Among the polycarbonic acid esters of the formula (I), diethylene glycol bis (allyl carbonate) is preferably used in the practice of the present invention.

In the UV-curable composition of the present invention, polythiol of the above-described general formula (II) is used as the second monomeric component (B). Preferably, the polythiol used herein is a compound represented by the following general formula (III):

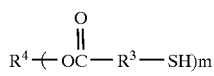

$$R^4 \!\!-\!\!(\text{OC}\!-\!R^3\!-\!\text{SH})_m \qquad \text{(III)}$$

in which $R^3$ represents a divalent organic group, $R^4$ represents a multivalent organic group, and m is an integer of at least 2. The polymerization product obtained from the compound can preferably exhibit an excellent resistance to shock, dyeing property and the like. The compound of the formula (III) is an ester of polythiol, and typical examples of suitable esters include ethylene glycol bis (thioglycolate), ethylene glycol bis(3-mercaptopropionate), trimethylol propane tris (thioglycolate), trimethylol propane tris (3-mercaptopropionate), pentaerythritol tetrakis (thioglycolate), pentaerythritol tetrakis(3-mercaptopropionate) and others.

In the UV-curable composition of the present invention, the polycarbonic acid ester as component (A) and the polythiol as component (B) are contained in a ratio (equivalent ratio) of about 2:1 to 1:3, preferably in a ratio of about 1.2:1 to 1:1.3. An amount of component (A) higher than the upper limit of the above-mentioned equivalent ratio range will not ensure a completion of the polymerization reaction. On the other hand, if the amount of component (B) is increased above the upper limit, the resulting polymerization product will produce a strong odor from the monomers used.

In the practice of the present invention, in addition to the above-described components (A) and (B), other monomeric components may be contained in the UV-curable composition of the present invention, insofar as they do not adversely influence the object of the present invention. Monomers which can be additionally used herein include, for example, acrylic compounds, styrene compounds, epoxy compounds and similar compounds.

Further, the UV-curable composition of the present invention contains a UV-curing agent as a third component (C). It is preferred that the UV-curing agent is incorporated (mixed) in an amount of about 0.008 to 1.0% by weight in the UV-curable composition with respect to the total amount of monomers used. The use of a UV-curing agent in an amount of less than 0.008% by weight will not ensure a satisfactory polymerization and curing reaction. Furthermore, if the UV-curing agent is used in an amount above 1.0% by weight, the resulting polymerization product will easily trap bubbles generated upon an exothermic reaction during addition of the UV-curing agent.

The UV-curing agent used herein is not restricted to the specific one, and accordingly a wide variety of well-known UV-curing agents may be used in the practice of the present invention. Suitable examples include 1-hydroxycyclohexyl phenylketone, 2-hydroxy-2-methyl-1-phenylpropane-1-on, α-aminoacetophenone, benzyl dimethyl ketal, benzophenone, bisacyl phosphine oxide and the like. These UV-curing agents may be used alone or in combination.

If necessary, the UV-curable composition according to the present invention may contain other additives, for example, elastomers such as silicone, acrylic rubber, nitrile rubber, epichlorohydrin rubber, isoprene rubber, butyl rubber and the like, a UV-absorbing agent, an antistatic agent, an antioxidation agent, a filling agent, a flame-retardant agent, dyes, pigments and others, in addition to the above-described components (A), (B) and (C).

When the UV-absorbing agent is used in the UV-curable composition, it is preferred that the agent is added in an amount of about 0.01 to 3.0% by weight with respect to the total amount of the monomers. An UV-absorbing agent of less than 0.01% by weight will not result in a satisfactory UV-absorbing effect, and a UV-absorbing agent of more than 3.0% by weight will cause a difficulty in dissolving the agent in the composition due to saturation thereof.

The UV-absorbing agent used herein is not restricted to a specific one, insofar as it can be dissolved in either or both of the monomeric components used, and accordingly a wide variety of UV-absorbing agents may be used in the practice of the present invention. Suitable UV-absorbing agents include, for example, benzophenones such as 2-hydroxybenzophenone, 2,4-dihydroxybenzophenone and the like, salicylates such as phenylsalicylate and the like, benzotriazoles such as (2'-hydroxyphenyl)benzotriazole, (2'-hydroxy-5'-methylphenyl)benzotriazole, 2,2-methylene-bis [4-(1,1,3,3-tetramethylbutyl)-6-(2H-benzotriazole-2-yl) phenol] and the like, and cyanoacrylates such as ethyl-2-cyano-3,3-diphenylacrylate and the like. These UV-absorbing agents may be used alone or in combination.

Since the polymerization in the UV-curable composition of the present invention is initiated with irradiation of UV rays, followed by curing of the resulting polymerization product, it is necessary to mix the above-mentioned starting components in the dark.

Upon UV irradiation onto the UV-curable composition, the polymerization reaction is initiated and proceeded in an atmospheric condition. After polymerization, neither deformation nor distortion is produced in the polymerization products or molded articles. In addition, since the polymerization products having excellent properties and characteristics with regard to durability, transparency, heat resistance, adhesive properties, shock resistance, dyeing properties, flexibility and the like, the UV-curable composition can be advantageously utilized in the production of adhesives, cushioning members such as an automobile bumper, optical elements, shock absorbers, dyeing aids, coating agents, fiber-impregnating agents, glass covers, photoresist materials, printing plates, gasket members and other articles.

For example, if the UV-curable composition of the present invention is intended to be used as a coating agent or material, it can be used in combination with a substrate, and suitable substrates include, for example, a plastic material such as polyethylene, polyester and the like, metal, wood, concrete, glass, ceramics, papers and the like.

EXAMPLES

The present invention will be further described with reference to some working examples thereof. Note, however, that the present invention should not be restricted to these examples.

Example 1

52.9 parts by weight of the polycarbonic acid ester of the above-mentioned general formula (I) in which n is 1, i.e., diethylene glycol bis (allyl carbonate), 47.1 parts by weight of pentaerythritol tetrakis(3-mercaptopropionate) of the above formula (II) in which m is 4, 0.1 parts by weight of 1-hydroxycyclohexyl phenylketone, commercially available under the trade name "Irgacure 184" from Ciba-Geigy (Japan) Ltd., as a UV-curing agent and 0.1 parts by weight of 2,2-methylene-bis[4-(1,1,3,3-tetramethylbutyl)-6-(2H-, benzotriazole-2-yl)phenol], commercially available under the trade name "Biosorb 583" from Kyodo Yakuhin Kabushikikaisha, as a UV-absorbing agent, were mixed in the dark. The resulting mixture was poured into a previously provided mold, and a surface of the mixture in the mold was irradiated with UV radiations at 20 mW/cm2 from a metal halide lamp. Curing of the mixture was initiated from a surface portion thereof after the UV irradiation was continued for about 30 seconds. The mixture was completely cured after the irradiation time of about 120 seconds. The thus produced cured product showed an appearance having no change of color such as yellowing, and the average transmittance to visible radiations having a wavelength of about 750 to 350 nm was about 92%.

Example 2

The procedure of the above-described Example 1 was repeated with the proviso that a 55.6 parts by weight of diethylene glycol bis(allyl carbonate), 44.4 parts by weight of pentaerythritol tetrakis(3-mercaptopropionate), 0.1 parts by weight of 1-hydroxycyclohexyl phenylketone, commercially available under the trade name "Irgacure 184" from Ciba-Geigy (Japan) Ltd., as an UV-curing agent and 0.1 parts by weight of 2,2-methylene-bis[4-(1,1,3,3-tetramethylbutyl)-6-(2H-benzotriazole-2-yl)phenol], commercially available under the trade name "Biosorb 583" from Kyodo Yakuhin Kabushikikaisha, as an UV-absorbing agent were used. Curing of the mixture was initiated after the UV irradiation was continued for about 31 seconds. The mixture was completely cured after the irradiation time of about 130 seconds. The thus produced cured product showed an appearance having no change of color such as yellowing, and the average transmittance to visible radiations having a wavelength of about 750 to 350 nm was about 93%.

We claim:

1. An ultraviolet-curable, resin-forming composition comprising:

(A) polycarbonic acid ester of the general formula (I):

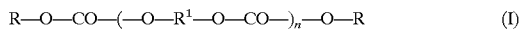

R—O—CO—(—O—R$^1$—O—CO—)$_n$—O—R    (I)

wherein R represents an unsaturated group, R$^1$ represents a divalent aliphatic or aromatic group, and n is an integer having a value from 1 to 9, (B) polythiol of the general formula (II):

R$^2$—(—SH)$_m$    (II)

wherein R$^2$ represents a multivalent organic group, and m is an integer of at least 2, and (C) ultraviolet curing agent.

2. The ultraviolet-curable composition according to claim 1, in which said components (A) and (B) are contained in an equivalent weight ratio of about 2:1 to 1:3.

3. The ultraviolet-curable composition according to claim 2, in which said component (C) is contained in an amount of about 0.008 to 1.0% by weight based on a total amount of the monomers contained in the resin-forming composition.

4. The ultraviolet-curable, resin forming composition according to claim 1, further comprising:

polythiol compound represented by the following general formula (III):

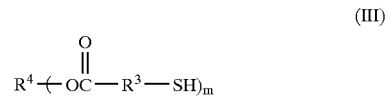

$$R^4 + OC - R^3 - SH)_m$$ (III)

wherein R$^3$ represents a divalent organic group, R$^4$ represents a multivalent organic group, and m is an integer of at least 2.

5. The ultraviolet-curable, resin-forming composition according to claim 1, wherein ultraviolet absorbing agent is added to said ultraviolet-curable, resin-forming composition, said ultraviolet absorbing agent is added in an amount of about 0.01 to 3.0% by weight based on total weight of the monomers contained in the resin-forming composition.

6. The ultraviolet-curable composition according to claim 1, wherein R$^1$ represents an aliphatic group.

7. The ultraviolet-curable composition according to claim 2, wherein R$^1$ represents an aliphatic group.

8. The ultraviolet-curable composition according to claim 3, wherein R$^1$ represents an aliphatic group.

9. The ultraviolet-curable composition according to claim 4, wherein R$^1$ represents an aliphatic group.

10. The ultraviolet-curable composition according to claim 5, wherein R$^1$ represents an aliphatic group.

11. The ultraviolet-curable composition according to claim 1, wherein the polycarbonic acid ester comprises diethylene glycol bis(allyl carbonate).

12. The ultraviolet-curable composition according to claim 2, wherein the polycarbonic acid ester comprises diethylene glycol bis(allyl carbonate).

13. The ultraviolet-curable composition according to claim 3, wherein the polycarbonic acid ester comprises diethylene glycol bis(allyl carbonate).

14. The ultraviolet-curable composition according to claim 4, wherein the polycarbonic acid ester comprises diethylene glycol bis(allyl carbonate).

15. The ultraviolet-curable composition according to claim 5, wherein the polycarbonic acid ester comprises diethylene glycol bis(allyl carbonate).

* * * * *